United States Patent [19]

McMaster

[11] 3,710,150
[45] Jan. 9, 1973

[54] POWER CONVERSION MEANS

[75] Inventor: Robert C. McMaster, Columbus, Ohio

[73] Assignee: The Ohio State University, Columbus, Ohio

[22] Filed: Oct. 29, 1970

[21] Appl. No.: 85,096

Related U.S. Application Data

[63] Continuation-in-part of Ser. No. 713,034, March 14, 1968, abandoned.

[52] U.S. Cl. .................. 310/8.1, 310/8.2, 310/8.7
[51] Int. Cl. ............................................. H01v 7/00
[58] Field of Search .......... 310/8.0, 8.1, 8.2, 8.3, 8.7, 310/8.6, 9.1, 28; 333/71, 72, 30; 321/1, 60

[56] References Cited

UNITED STATES PATENTS

| | | | |
|---|---|---|---|
| 3,395,295 | 7/1968 | Crane | 310/8.2 X |
| 3,112,486 | 11/1963 | Adler | 310/8.1 X |
| 3,595,325 | 7/1971 | Libby | 310/8.2 X |
| 3,396,285 | 8/1968 | Minchenko | 310/87 |
| 2,539,535 | 1/1951 | Espenschield | 310/8.6 X |
| 3,397,328 | 8/1968 | Schafft | 310/8.3 X |
| 1,815,853 | 7/1931 | Lake | 310/28 X |
| 3,481,411 | 12/1969 | Wood | 310/9.1 X |

*Primary Examiner*—J. V. Truhe
*Assistant Examiner*—B. A. Reynolds
*Attorney*—Anthony D. Cennamo

[57] ABSTRACT

The invention is for a system for frequency conversion of large magnitudes of electrical or mechanical power, or of electrical into mechanical power, or of mechanical into electrical power. Power levels of the order of many horsepower are connected to lower or higher frequencies by impact coupling of high-power sonic transducers.

6 Claims, 7 Drawing Figures

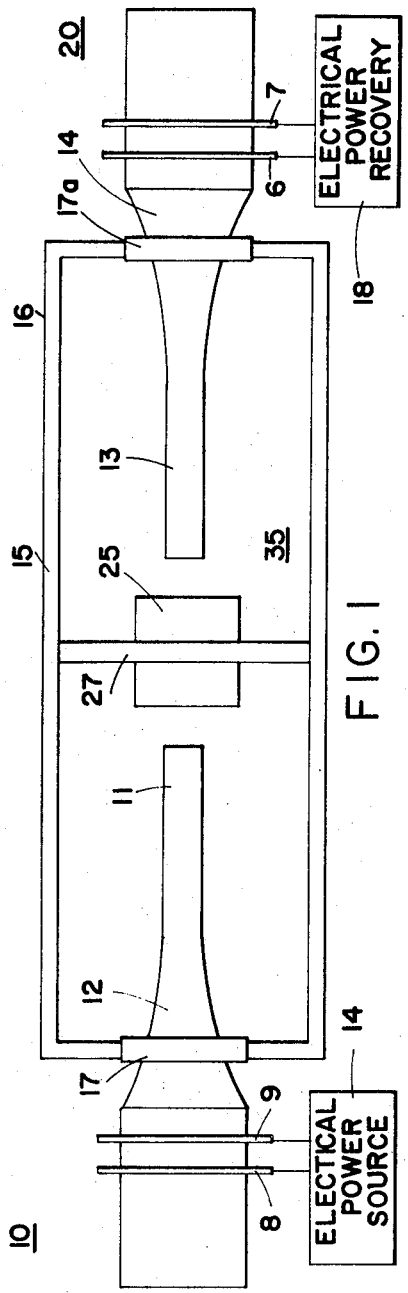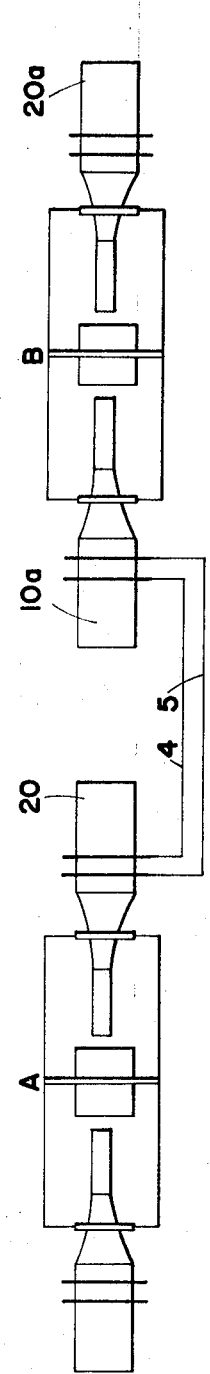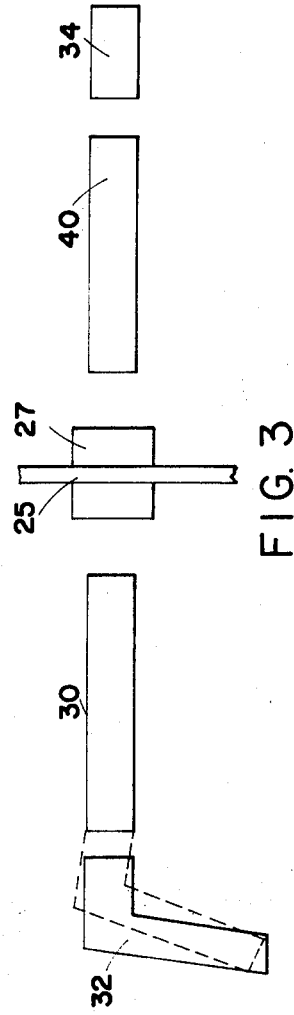

POWER CONVERSION MEANS

CROSS REFERENCES AND BACKGROUND

This application is a continuation-in-part of my copending application, Ser. No. 713,034, filed Mar. 14, 1968, for "Power Conversion Means", now abandoned.

There is disclosed in patent application Ser. No. 571,490, now U.S. Pat. No. 3,396,285, for "Electromechanical Transducer" by H. M. Minchenko, a transducer capable of delivering extremely high power, i.e., measurable in horsepower (or kilowatts) at an acoustical frequency range. The principle underlying the high-power output is in the structural arrangement of the components immediately associated with the piezoelectric driving elements. In theory and practice, the piezoelectric elements are under radial and axial pressure that assure that they do not operate in tension even under intense sonic action. Significantly, the structural design of this transducer, that permits the extraordinary power output from the driving elements, resides in the novel method of clamping the piezoelectric elements both radially and longitudinally (axially). In this way the acoustic stresses in the piezoelectric elements are always compressive, never tensile, even under maximum voltage excitation.

The transducer disclosed in the aforementioned patent is intended, and therefore utilized, to deliver a steady-state signal. That is, the piezoelectric assembly is a component of a resonant structure that will produce a mechanical vibratory output at the frequency of the driving electrical signal — and vice versa. In the copending application, Ser. No. 606,257, filed Dec. 30, 1966, now U.S. Pat. No. 3,466,473, for "High Voltage Sonic Pulse Generator", by Merle L. Rhoten, there is described a voltage generator capable of delivering a pulse that could be of a high voltage and/or high current or alternatively could be of extremely small voltage and current. The primary and unique principle resides in the utilization of the piezoelectric driver assembly disclosed in the aforesaid copending application. The assemblies are stacked in a column with means at one end thereof to apply a physical impact. With each impact an electrical pulse is generated. The voltage of the pulse — or the current — is proportional to the pressure applied with the impact and also to the size of the piezoelectric elements in the driver assemblies.

There is further disclosed in the copending patent application, Ser. No. 637,171, filed May 9, 1967, now abandoned, for "High Power Continuous Wave Voltage Generator" by Merle L. Rhoten, a method and means of utilizing the stack of crystal assemblies described in the aforementioned patent application to provide a source of energy useful in those areas where very large quantities of energy are required. To convert the pulse generator to an alternating current generator, cycling or timed pressure is applied in a controlled manner to the crystal assembly. The high-power pulses generated (a positive and negative slope is generated with each impact) have a frequency directly related to the frequency of the applied pressure. In this way more electrical power per size and weight of the generator is produced then heretofore has been possible with the prior art devices.

SUMMARY OF THE INVENTION

The present invention is related to converting electrical or mechanical high energy from one frequency to another frequency. The system of the present invention is not primarily concerned with the generator of electrical or mechanical power as in the aforesaid patent applications; however, the high-power transducer, of the copending application, can be utilized when the frequency conversion is of a large magnitude power. The impact principle of the other copending patent application is utilized in the present invention.

The fundamental principle underlying the present invention resides in transferring large quantities of power between two resonant bodies via an intermediate mass mounted between the two resonant bodies so as to constitute a freely-moving mass, not necessarily resonant in itself, capable of transmitting momentum and kinetic energy during its periods of free flight between the faces of the oscillatory vibrating terminal members, and of absorbing or delivering both momentum and kinetic energy during its impacts with the vibratory terminal members. The two resonant bodies may typically comprise sonic transducers of differing resonant frequencies. Alternative systems comprise substituting for one or the other of the transducers with mechanical means capable of generating impact forces or having a finite resonant frequency.

OBJECTS OF THE INVENTION

It is accordingly a principle object of the present invention to provide a new and improved generator capable of converting large magnitudes of power from one frequency to another.

Another object of the invention is to provide such a converter that is capable of converting large quantities of electrical power of one frequency to another or alternatively, of converting mechanical power of one frequency to electrical power of another frequency.

A further object is to provide a high-voltage frequency converter that is rugged, simple, and extremely efficient.

Other objects and features of the invention will become apparent from a reading of the detailed description when taken in conjunction with the drawings in which:

BRIEF DESCRIPTION OF THE DRAWINGS

FIG. 1 illustrates schematically a frequency converter of the present invention utilizing a pair of sonic transducers;

FIG. 2 illustrates schematically a frequency converter of the present invention utilizing a pair of resonant mechanical transducers;

FIG. 3 illustrates schematically the frequency converter system of FIG. 1 in series;

DETAILED DESCRIPTION OF THE PREFERRED EMBODIMENTS

Figure 4:
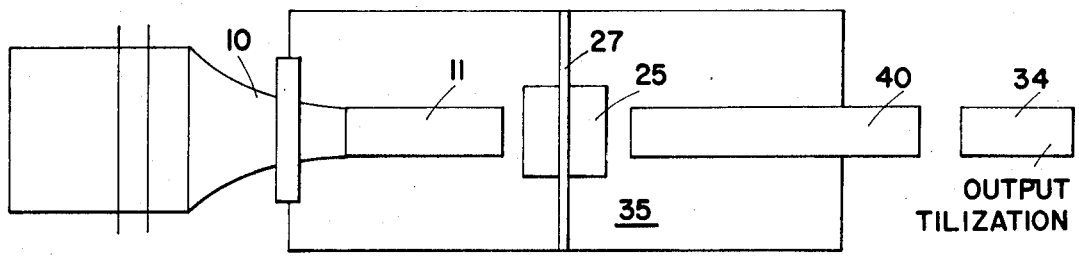
FIG. 4 illustrates schematically a frequency converter system of the present invention utilizing a sonic transducer as the input motor and a mechanical resonator at the output.

With reference to FIG. 1 there is shown a first preferred embodiment of the invention for converting electrical energy of one frequency to electrical energy of another frequency. Specifically, a pair of sonic transducers, 10 and 20, such as those disclosed in the aforesaid copending patent application are utilized. Transducer 10 is operable to deliver a steady-state signal, that is, the piezoelectric assembly is a component of a resonant structure that will produce a mechanical vibratory output at the frequency of the driving electrical signal — and vice versa. Transducer 10, in this instance, is of a given frequency, that is, it is a resonant structure at a particular frequency. Transducer 20 is a similar structure as the transducer 10 — the significant difference being that it is designed to resonant at a different frequency. In each of the two transducers, 10 and 20, the conversion of energy is normally electrical to mechanical energy. The force of the energy is concentrated at the tips 11 and 13 of the horns 12 and 14. In this arrangement of FIG. 1, the purpose is to convert in transducer 10 electrical energy to mechanical energy the, in turn, convert in transducer 20 the mechanical energy back to electrical energy. However, since the two transducers 10 and 20 are designed to resonate at different frequencies, the energy concentrated at the tip 11 of transducer 10 will be at a different frequency than that of transducer 20.

The two transducer 10 and 20 are mutually arranged to transfer power by interrelated coupling means 35. The structural apparatus for the transfer means includes a housing 15 which may be a hollow cylinder having an outer wall 16. The transducers 10 and 20 are each securely fastened at 17 and 17a to the housing. This is accomplished without a loss of power or a change in frequency of the transducers by clamping the housing to the transducers at their nodes. The nodal points are the points of minimum amplitude and maximum stress.

Basically, the principle of the arrangement of FIG. 1 is to apply the output mechanical energy, i.e., the energy concentrated at the tip 11 of transducer 10 to the tip 13 of transducer 20. In this way the tip 13 of transducer 20 is mechanically excited. This excitation is, in turn, converted into electrical energy by the piezoelectric transducer 20 — but at a frequency of the transducer 20 not that of the excitation.

In a practical working embodiment, the transfer of mechanical energy from one transducer to another cannot be consummated directly, but must be done by an intermediary force. With continued reference to FIG. 1, the mechanical energy transfer means is shown at 25 in the coupling means 35. Particularly, between the output shaft ends 11 and 13 of the force horn concentrators 12 and 14 a bouncing mass 25 is supported. The mass 25 is fixedly positioned between the tips 11 and 13 by plate fulcra and diaphragm supports 27 attached to the inner walls of the supporting cylinder 15. In this position the movement of the mass is restricted linearly along a line between the two output concentrator tip surfaces 11 and 13. A bias spring force, inherent in the plate fulcra or diaphragm 27, holds the mass 25 in contact with the driving transducer tip 11, when not vibrating.

In operation, when the driving transducer 10 is excited, its output shaft displacements "bounce" the oscillating intermediate mass member 25 back and forth between the tips 11 and 13 of the two transducer units 10 and 20. This transfers power by repeated impacts, alternately between the driver and the driven unit, i.e., between the two piezoelectric motors or transducers 10 and 20. Since the individual piezoelectric transducers 10 and 20 are supported only at their nodes, they are each free to vibrate at their own individual resonant frequency — regardless of the different frequency at which the other piezoelectric transducer vibrates. Electric power at the driver frequency is supplied to the driving transducer 10 at electrodes 8 and 9 from source 14. Electric power is recovered by electrical power source 18 from the electrodes 6 and 7 of the driven transducer 20 at its resonant frequency.

It has been demonstrated that impact coupling from a high-power transducer to a workpiece may be accomplished. The significance is that the natural halfwavelength vibration frequency of the workpiece is perhaps four times that of the transducer when the work effort begins and might rise to much higher frequencies when nearing completion of the work effort. Again, in the sonic metal deformation process described in Ser. No. 676,550, now U.S. Pat. No. 3,609,851 filed Oct. 19, 1967, for "Metal Working Apparatus and Process," by Robert C. McMaster, et al, an intermediate metallic element alternately contacts the sonic motor, and the material being deformed. In one application of the process, the intermediate member is bouncing back-and-forth at frequencies in the order of 1/10 to 1/3 of the driving transducer frequency. In each, despite the changing resonant frequency of the receiving member, the average power flow typically remains constant (in one embodiment at 10 kilowatts) during these frequency conversions. Thus, the basic system of the present invention is fundamentally a frequency converter for large quantities of power.

Intermediate bouncing mass member 25 is in general not a resonant body. Effectively, mass member 25 acts in the present system as a reversible projectile which carries kinetic energy equal to its mass multiplied by one-half the square of its velocity (K.E. = ½ mv$^2$) in its transit back and forth between its impacts with the two resonant vibrational systems. Mass member 25 can operate to transfer large quantities of power between two resonant bodies whose frequencies have no constant or integer relationship between one another. These frequencies can, in fact, change continuously without loss of efficiency of power transfer over large frequency ranges.

The size, shape, and weight of bouncing mass member 25 can be varied over wide limits without greatly influencing its power transfer capabilities. Mass 25 can be constructed of such materials as to (in a theoretical limit) be totally incapable of internal vibrations, and will yet perform its function completely.

Furthermore, the bouncing mass member 25 is not limited or constrained to levels of force impacts below its elastic limit (or that of the driving or driven element materials).

The spacing between the impact forces 11 and 13 of the resonant vibrating masses in FIG. 1 (between which bouncing mass member 25 acts as a reversible projectile) may, within great limits, be increased without preventing the power transfer, although if long flight paths are involved, the average rate of power transfer may diminish because of the finite quantities of energy carried on each round trip of the projectile.

The basic mechanism of energy transfer in the present system is such that force impulses from one or many cycles of the driving member may be required to (a) stop the incoming bouncing-mass projectile and then (b) reverse its direction of motion and accelerate it to a high outward velocity. Similarly, after crossing the intervening space, the bouncing-mass projectile may impact the driven member either elastically or inelastically, and may require one or several repeated impacts by the oscillating face of the driven member to reverse its momentum. Basically, in flight, the mass 25 carries a momentum M, equal to:

$$M = mv \qquad (1)$$

and kinetic energy K.E. equal to:

$$K.E. = \tfrac{1}{2} mv^2. \qquad (2)$$

Upon impact and reversal of its flight direction, it absorbs or delivers a quantity of momentum, $\Delta M$, equal to:

$$\Delta M = m(v_1 + v_2) \qquad (3)$$

and absorbs or delivers a quantity of kinetic energy, (K.E.) equal to:

$$\Delta(K.E.) = (m/2)(v_1^2 - v_2^2) \qquad (4)$$

where in Eqs. (3) and (4), $v_1$ is the magnitude of the initial velocity (prior to impact), and $v_2$ is the magnitude of the final velocity, following impact.

During its impactive reaction with either of the individual vibrating terminal members of its flight path, the bouncing mass momentum, M, can be greater than that which could be stopped or reversed by a single impact contact with the vibrating member. In such a case, the change in its momentum, $\Delta M$, might be provided by a succession of impacts between the face of the bouncing mass 25 and the face of the vibrating terminal member:

$$\Delta M = \Sigma \int F dt. \qquad (5)$$

In Eq. (5), $\Sigma$ = Summation, and $\int F dt$ indicates time integration of the impact force, F, over the duration of the impact (time in seconds). Basically, the relation of Eq. (5) expresses a conservation of momentum principle; effectively in the present system input energy at a terminal member is coupled to the remaining terminal via conversion to the momentum of the intermediate mass member.

The electrical power output at the new frequency can be used to drive electrical or electronic apparatus or loads, as desired. The unit thus replaces alternator frequency-conversion rotating machine systems, or solid-state or electron tube frequency conversion systems. The preferred embodiment provides very high power capacities in small spatial volume by a lowweight system involving no rotating elements — at high efficiencies typically expected to exceed 90 percent. The probable costs of such a system, for conversion of power levels of 1 to 15 (or more) horsepower, are considerably less than that of conventional frequency-conversion systems.

With reference to FIG. 2 there is illustrated the frequency conversion system of FIG. 1 but in a series arrangement by interconnecting the converters A and B by electrical means 4 and 5. Specifically, the electrical output from transducer 20 to excite transducer 10a (through connections 4 and 5). The twice-converted frequency is then taken from transducer 20a. With the configuration of this embodiment, repeated frequency conversions with frequency ratios as much as 10:1 in each state are accomplished. Thus, in the system of FIG. 2 there may be attained frequency ratios such as 100:1 in two states, 1000:1 in three states, etc. In the limit, there may be converted power frequencies such as 60 Hz and 400 Hz to much higher frequencies such as 20 kHz to 100 kHz, by the utilization of the series shown in FIG. 2 in cascade.

A frequency conversion system with mechanical resonators 30 and 40 as input and output elements in lieu of the electromechanical piezoelectric transducers 10 and 20 is shown in FIG. 3. An intervening bouncing mass element 25 supported in a manner shown in FIG. 1 is used for the mechanical-to-mechanical power conversion systems. Each mechanical resonator 30 and 40, in this instance, is of solid or composite steel or other metallic material. Similar to the piezoelectric transducers, each is a high-Q mechanical resonator. When one mechanical element is caused to vibrate at its natural resonant frequency such as by striking or excitation through an external driving means 32, the bouncing mass 25 transfers power from one mechanical resonator 30 to another mechanical resonator 40. The recipient resonator then vibrates at its own natural resonant frequency and is utilized through means 34.

In a frequency conversion system as shown in FIGS. 1 and 2, either resonator could be a mechanical resonator or a piezoelectric transducer 10 used as the driving unit and a mechanical resonator 40 used as the receiving unit, electric power inputs of one frequency are converted to mechanical vibratory power outputs of a differing frequency. Alternatively, with a mechanical resonator used as the driving element, and a piezoelectric transducer used as the receiving element as shown in FIG. 5, mechanical input power of one frequency could be used to generate electrical power output of a differing frequency.

Figure 5:
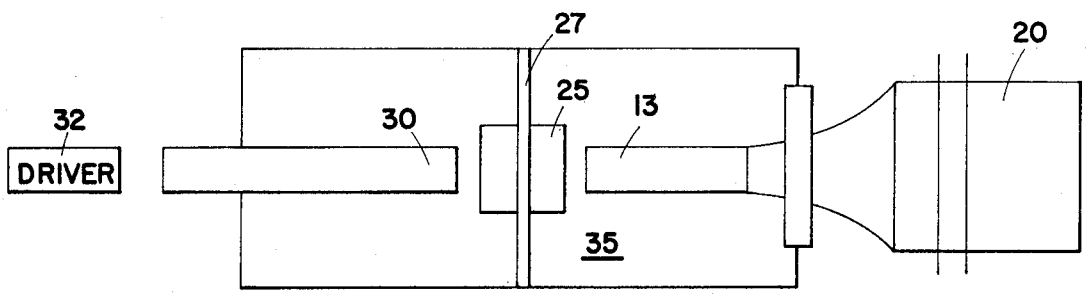
FIG. 5 illustrates schematically a frequency converter system utilizing a mechanical resonator at the input and a sonic transducer at the output.

Systems, such as shown in FIGS. 4 and 5, may be substituted for the resonators shown in FIG. 2 to provide several successive steps of power frequency conversion.

Figure 6:
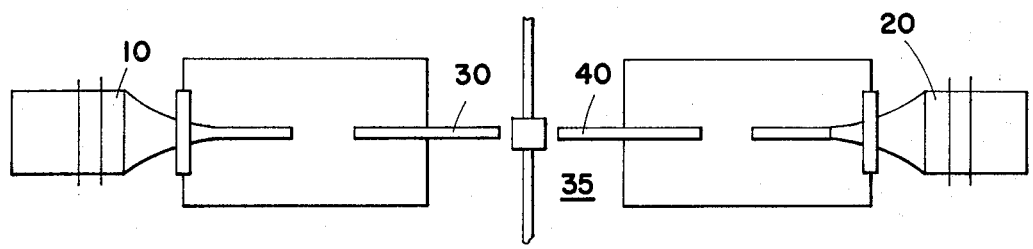
FIG. 6 illustrates schematically a frequency converter system in series wherein a sonic transducer is utilized at the input and also at the output and mechanical resonators are utilized as the intermediary converters; and, FIG. 7 illustrates schematically a frequency converter system with a free piston engine in series with a pair of sonic transducers.

In the cascading of frequency converters, as mentioned above, it may be more expedient to employ intermediate mechanical-to mechanical frequency converters with electrical-to-mechanical conversion at the input and output states, and not in the intermediate states. A cascaded system is shown in FIG. 6 wherein the mechanical resonators 30 and 40 are utilized as the intermediary frequency converters. Transducer 10 is the input resonator and transducer 20 the output transducer. Alternatively, there may be provided a portion of the input power at each of several intermediate stages operating at different frequencies.

Utility of the mechanical power frequency conversion system resides in the adaption of high-frequency input vibrations of low displacement amplitudes to successively larger amplitude, lower-frequency vibrations. In this way sonic system utilizes power from a common source to actuate processes with differing frequency and displacement amplitude requirements.

As a further extension of the principle of the present invention, particularly as shown in FIGS. 3, 4, 5, either of the mechanical resonator 30 or 40 may be a thermal engine. These engines are capable of converting fuels through chemical combustion or explosions to mechanical power. In this way the thermal engines are utilized as the drivers in systems with either electrical or mechanical power outputs of quite different frequencies from those supplied by the driver.

Figure 7:
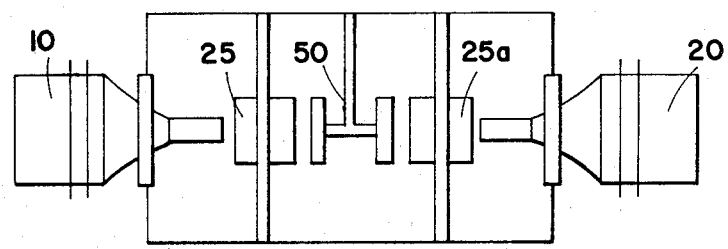

A particular configuration is shown schematically in FIG. 7 wherein the free-piston engine 50, where fuel explosions produce a reciprocating motion of the piston, is utilized. Alternatively FIG. 7A illustrates schematically a free-running piston engine 51. The engine 50, or 51 as an inertial or impact driving system, actuates either mechanical or piezoelectric resonator transducers. To generate electrical power output, the impacts or inertial forces generated by the reciprocating engine 50 or 51 are applied through bouncing masses 25 and 25a operating at their own resonant frequency. Alternatively, a series of intermediate mechanical-to-mechanical frequency converters, such as shown in FIG. 2 could be used to step up the operating frequencies in sequential stages. If vibratory mechanical power outputs are desired at frequencies other than those supplied directly by the free-piston engine, similar mechanical-to-mechanical frequency conversion states could be supplied to attain the desired output vibration frequencies and amplitudes. Alternatively, other forms of internal combustion engine, steam engine, or turbine may be substituted for thermal engines.

Other input mechanical impact or vibratory power, for example, hydraulic vibrators (whose inertial piston is driven by pressurized fluids in a reciprocating motion) and pneumatic vibrators (such as pavement-breaking hammers) could be used as input power sources.

Similarly, rotating eccentric mass or ball systems could be used as input drivers, to provide mechanical vibrations or high-frequency electrical power outputs.

Although certain and specific embodiments have been shown and described, modifications may be made within the spirit and scope of the invention.

What is claimed is:

1. A frequency conversion system comprising: a first electromechanical structure resonant at a first frequency; a second electromechanical structure resonant at a second frequency, each of said structures having input and output energy means, the output energy means of said first structure and input energy means of said second structure comprising impact forces; means for holding said impact forces in special relationship from one another; means to excite said first resonant structure to vibrate at its said frequency; a non-resonant projectile mass mounted intermediate said impact forces for free movement back and forth therebetween, vibration of said first resonant structure effecting oscillatory movement of said mass back and forth between said impact forces, whereby said projectile mass transmits momentum and kinetic energy during its periods of free flight between said forces and absorbs or delivers momentum and kinetic energy during impacts with said forces, thereby causing said second structure to vibrate at its resonant frequency; and utilization means connected to said second structure.

2. A frequency conversion system as set forth in claim 1 wherein said resonant structures are high Q sonic transducers and said excitation is electrical excitation.

3. The frequency conversion system as set forth in claim 1 wherein said resonant structures are mechanical transducers and said excitation is by mechanical impact.

4. A frequency conversion system as set forth in claim 1 wherein one of said resonant structures is a sonic transducer and the other of said structures is a mechanical transducer.

5. A frequency conversion system as set forth in claim 1 further comprising a plurality of resonant structures connected in cascade.

6. A frequency conversion system as set forth in claim 5 further comprising a plurality of series converters connected in cascade.

* * * * *